United States Patent
Korowajczuk

(10) Patent No.: US 9,264,261 B2
(45) Date of Patent: Feb. 16, 2016

(54) CHARACTERIZING A BROADBAND WIRELESS CHANNEL

(71) Applicant: Celplan Technologies, Inc., Reston, VA (US)

(72) Inventor: Leonhard Korowajczuk, Herndon, VA (US)

(*) Notice: Subject to any disclaimer, the term of this patent is extended or adjusted under 35 U.S.C. 154(b) by 0 days.

(21) Appl. No.: 14/341,734

(22) Filed: Jul. 25, 2014

(65) Prior Publication Data
US 2015/0030063 A1 Jan. 29, 2015

Related U.S. Application Data

(60) Provisional application No. 61/858,248, filed on Jul. 25, 2013.

(51) Int. Cl.
*H04L 25/02* (2006.01)
*H04B 7/06* (2006.01)
*H04L 27/26* (2006.01)

(52) U.S. Cl.
CPC ........ *H04L 25/0204* (2013.01); *H04L 25/0212* (2013.01); *H04L 25/0222* (2013.01); *H04B 7/0613* (2013.01); *H04L 25/0232* (2013.01); *H04L 27/2655* (2013.01)

(58) Field of Classification Search
CPC ............... H04B 7/0632; H04B 7/0626; H04B 1/10–1/14; H04B 1/1027–1/126; H04B 1/76; H04L 25/08; H04L 5/0048–5/0051
See application file for complete search history.

(56) References Cited

U.S. PATENT DOCUMENTS

| | | | | |
|---|---|---|---|---|
| 2004/0258014 | A1* | 12/2004 | Ro et al. | 370/328 |
| 2005/0094550 | A1* | 5/2005 | Huh et al. | 370/203 |
| 2006/0007850 | A1* | 1/2006 | Park et al. | 370/209 |
| 2008/0225689 | A1* | 9/2008 | Bickerstaff et al. | 370/208 |

* cited by examiner

*Primary Examiner* — Dac Ha
(74) *Attorney, Agent, or Firm* — Symbus Law Group, LLC; Clifford D. Hyra

(57) ABSTRACT

Embodiments disclosed herein provide systems and methods for determining properties of a channel response in frequency and time at a subcarrier basis. The determined properties of the channel may include a power delay profile (PDP), channel impulse response, attenuation and phase response over frequency and time, and antenna correlation over the wireless network.

18 Claims, 9 Drawing Sheets

800

CHARACTERIZING A BROADBAND WIRELESS CHANNEL

CROSS-REFERENCE TO RELATED APPLICATIONS

This application claims a benefit of priority under 35 U.S.C. §119 to Provisional Application No. 61/858,248 filed on Jul. 25, 2013, which is fully incorporated herein by reference in its entirety.

TECHNICAL FIELD

This disclosure relates generally to systems and methods for characterizing a broadband wireless channel. Specifically, this disclosure relates to characterizing a radio frequency (RF) channel response in frequency and time at a subcarrier basis.

BACKGROUND

In wireless communications, channel characterization refers to the channel properties of a communication link. The channel properties include information associated with how a signal propagates from a transmitter to a receiver. The channel properties may include information such as scattering, fading, power decay, etc. that may be responsive to the environment between the transmitter and the receiver. Because different environments have different topologies and elements that cause signals to propagate differently, wireless networks require knowledge of a channel's properties to effectively transmit signals across a channel.

Conventionally to determine a channel's properties, measurements of the channel response in terms of average power are determined over the channel. Determining the average power over the entire channel is very time consuming and requires expensive equipment that is not economically efficient or capable with drive tests.

Accordingly, needs exists for improved methods and systems for determining a channel's characteristics.

SUMMARY

Embodiments disclosed herein provide systems and methods configured to determine a channel's characteristics based on a channel's response in frequency and time at a subcarrier basis. The channel's characteristics may be utilized to determine:

The best cell deployment location in terms of RF uniformity,
A cyclic prefix length
The number of antennas to be deployed to best explore MIMO capabilities, and/or
The antenna configuration adjustment to maximize uncorrelation.

In embodiments, an orthogonal frequency division multiplexing (OFDM) transmitter may transmit OFDM signals over a channel's bandwidth. The transmitted OFDM signal may be utilized to characterize the properties of the RF channel. In embodiments, the transmitted OFDM signal may only include synchronization signals and/or pilot signals. In other embodiments, the transmitted signal may be a conventionally transmitted OFDM signal.

A transmitted OFDM signal may be comprised of orthogonal subcarriers, including designated reference or pilot signals (referred to hereinafter as "pilot signals). The pilot signals may include information configured to determine channel variation within the frames of the transmitted OFDM signal. In embodiments, the frames of the transmitted OFDM signal may have a specific duration that may be determined by empirical evidence or any desired period of time.

In embodiments, the environment associated with RF channel between the transmitted and a receiver may distort the transmitted OFDM signal. For example, buildings, trees, mountains, etc. may distort the transmitted OFDM signal, such that each transmitted OFDM signal may have a different channel response based on the location of the transmitter and/or the receiver.

In embodiments, a software defined receiver (SDR) may be configured to receive the transmitted OFDM signal over the channel. Responsive to receiving the transmitted OFDM signal, the SFR may digitize the received OFDM signal, process the OFDM signal utilizing a Fast Fourier Transform (FFT), and synchronize the transformed signal at the frame and symbol level to determine Q and I components of each subcarrier's signal.

In embodiments, responsive to determining the Q and I components of each subcarrier signal a channel impulse response and the power delay profile of the transmitted OFDM signal may be detected. In embodiments, the Q and I components may be equalized based on the pilot signals.

The SDR may be configured to analyze the equalized Q and I components to determine the amplitude and phase of the subcarrier signals to determine the channel response for each pilot subcarrier signal in time and phase over one or more frames.

In embodiments, if a subcarrier signals did not include pilot signals their channel response may be determined by interpolation of the determined Q and I components of the other subcarrier signals.

In embodiments, the channel response of the subcarrier signals may be utilized to generate channel parameters. The subcarrier signal frames may determine parameters of the channel response, including but not limited to:

Average amplitude and phase variation and standard deviation,
Number of fading above a certain attenuation, with average duration and standard deviation in time and frequency,
Correlation between signals received by different antennas,
Power Delay Profile,
Channel Impulse Response, and/or
Any other determined parameter.

In embodiments, the SDR may be any client computing device, such as a smartphone, tablet, etc. that may be configured to receive a transmitted OFDM signal and determine the Q and I components of a subcarrier signal frame.

In embodiments, the SDR may receive and analyze data over a drive test of an environment supported by a wireless network, and the analyzed data may be configured to modify the channel characteristics to improve and/or optimize the wireless network.

In embodiments, the channel's characteristics may include a power delay profile (PDP), a channel impulse response, attenuation and phase response over frequency and time, and/or antenna correlation.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

DETAILED DESCRIPTION

Figure 1:
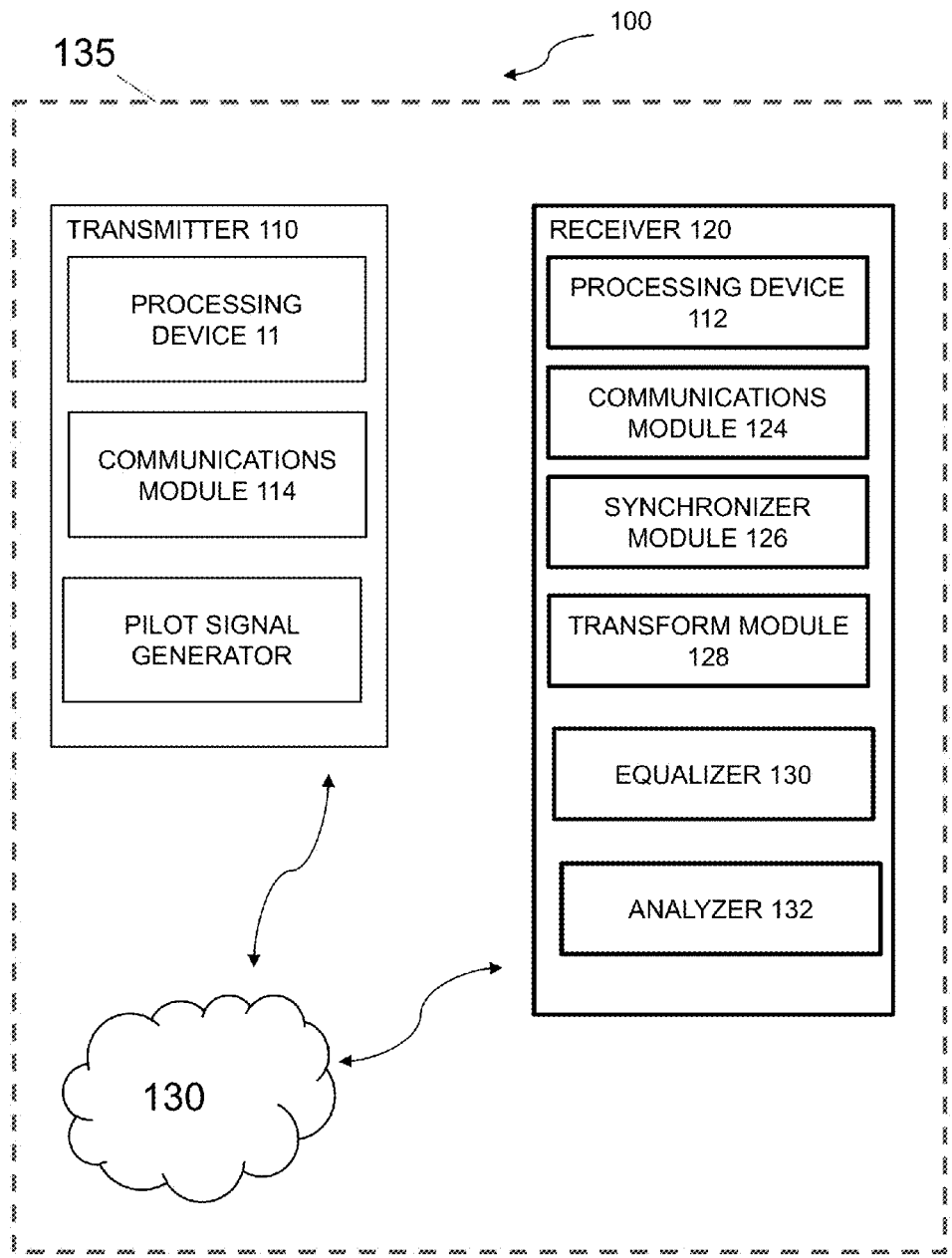
FIG. 1 depicts an embodiment of a network topology o characterize the response of a broadband wireless channel.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc.

Embodiments disclosed herein provide systems and methods for determining characteristics of a channel response in frequency and time at a subcarrier basis. The determined characteristics of the channel may include a power delay profile (PDP), channel impulse response, attenuation and phase response over frequency and time, and antenna correlation over the wireless network.

FIG. 1 depicts an embodiment of network topology 100 to characterize the response of a broadband wireless channel. The network topology 100 includes at least one transmitter 110, at least one receiver 120, network 130, and environment 135. The transmitters 110 and receiver may be configured to wirelessly communicate with each other over network 130.

Network 130 may be a wired or wireless network such as the Internet, an intranet, a LAN, a WAN, a WLAN, Wi-Fi, WiMax, LTE, DVB, a virtual private network (VPN), a cellular network, radio network, telephone network, and/or another type of network. It will be understood that network 130 may be a combination of multiple different kinds of wired or wireless networks. In embodiments, network 130 may include a plurality of channels and sub-channels that operate over defined bandwidths, which may be OFDM based channels. Network 130 may be configured to communicate data from a first element, such as transmitter 110, to a second element, such as receiver 120.

Environment 135 may be the setting, location, or area that network 130 is disposed in. In embodiments, environment 135 may include weather or seasonal elements, a plurality of structures such as buildings, edifices, mountains, trees, valleys, rivers, or other elements. Responsive to environment 135, signals transmitted across network 130 may be affected. Due to the environment 135 being different for signals transmitted and received from different positions within environment 135, environment 135 may propagate the communicated signals differently responsive to location of the transmitter and/or the location of the receiver within environment 135.

Transmitter 110 may be any type of computing device with a hardware processor that is configured to process instructions and connect to network 130, or one or more portions of network 130. In one embodiment, transmitter 110 may include processing device 112, communications module 114, and pilot signal generator 116.

Processing device 112 may include memory, e.g., read only memory (ROM) and random access memory (RAM), storing processor-executable instructions, and one or more processors that execute the processor-executable instructions. In embodiments where processing device 112 includes two or more processors, the processors may operate in a parallel or distributed manner. Processing device 112 may execute an operating system of transmitter 110 or software associated with other elements of transmitter 110, such as information associated with communications module 114 and/or pilot signal generator 116.

Communications module 114 may be a hardware device configured to communicate with another device, e.g., receiver 120 over network 130. Communications module 114 may include one or more wireless transceivers for performing wireless communication. In embodiments, communications module 114 may be configured to transmit OFDM signals that are comprised of orthogonal subcarriers. Communications module 114 may be configured to transmit the OFDM over a communication channel over network 130. In embodiments, at least one of the orthogonal subcarriers may be designated as reference pilot signals. Communications module 114 may be configured to transmit OFDM signals at set frames with a specific duration. In embodiments, the specific duration for each of the frames may be the same length of time. In embodiments, the transmitted OFDM signals may only include synchronization signals that are configured to synchronize the transmitted OFRM signals from transmitter 110 and the reference pilot signals.

Pilot signal generator 116 may be configured to generate the pilot signals that are transmitted within OFDM signals. The pilot signals may be utilized for control, equalization, continuity, synchronization, and/or reference purposes of the transmitted OFDM signals.

Receiver 120 may be an antenna, software defined receiver (SDR), smart phone, tablet computer, laptop computer, wearable computer, personal data assistant, or any other type of mobile device with a hardware processor that is configured to receive data over network 130, and may be communicatively coupled to transmitter 110 over network 130. Receiver 120 may include processing device 122, communications module 124, synchronizer module 126, transform module 128, equalizer 130, and analyzer 132.

Processing device 122 may include memory, e.g., read only memory (ROM) and random access memory (RAM), storing processor-executable instructions and one or more processors that execute the processor-executable instructions. In embodiments where processing device 122 includes two or more processors, the processors may operate in a parallel or distributed manner. Processing device 122 may execute an operating system of receiver 120 or software associated with other elements associated with receiver 120.

Communications module 124 may be a hardware device configured to receive communications from another device, e.g., transmitter 110 over network 130. Communications module 124 may include one or more wireless transceivers for performing wireless communications and/or one or more communication ports for performing wired communications. In embodiments, communications module 124 may be configured to receive a transmitted OFDM signal from transmitter 120 over a channel and digitize the received signal.

Synchronizer module 126 may be a hardware device configured to synchronize the digitized received signal. Synchronizer module 126 may be configured to synchronize the received signal at the frame and/or symbol level. Therefore, the received signal may be separated into sub-parts and analyzed to determine the channel response properties at the subcarrier, frame, and/or symbol level. In embodiments, synchronizer module 126 may synchronize the received signal in the frequency and/or time domain, so the symbols of the received signal may be received.

Transform module 128 may be a hardware device that is configured to transform the digitized received signal via a FFT. The FFT may be utilized to eliminate repetitive signals from the received signal and decompose the received signal into its fundamental intensity frequencies, such that the signal may be filtered and recombined to generate a new signal. Transform module 128 may be configured to transform the digitized signal into a two data values, an in-phase signal value (I) and quadrature phase signal value (Q) over each subcarrier symbol of the digitized signal.

Equalizer 130 may be a hardware device configured to equalize the received digitized signal. Equalizer 130 may be configured to equalize the received signal responsive to the pilot signals transmitted within the OFDM signal from transmitter 110. In embodiments, the I and Q subcarrier symbols may be equalized in the frequency and time domain.

Analyzer 132 may be a hardware device configured to perform statistical analysis on a symbol basis, subcarrier signal basis, and frame basis to determine channel response properties of an OFDM signal transmitted from transmitter 110 to receiver 120. Analyzer 132 may be configured to analyze multiple occurrences of the synchronized signal to detect the channel impulse response and a power delay profile of the channel. Analyzer 132 may also be configured to analyze the I and Q subcarrier symbols in terms of amplitude and phase to obtain the channel response for each pilot subcarrier signal in time and phase for one or more frames. In embodiments, the channel response for the remaining subcarriers may be estimated based on the interpolation of the obtained channel response for the pilot subcarrier signals for the one or more frames.

Figure 2:
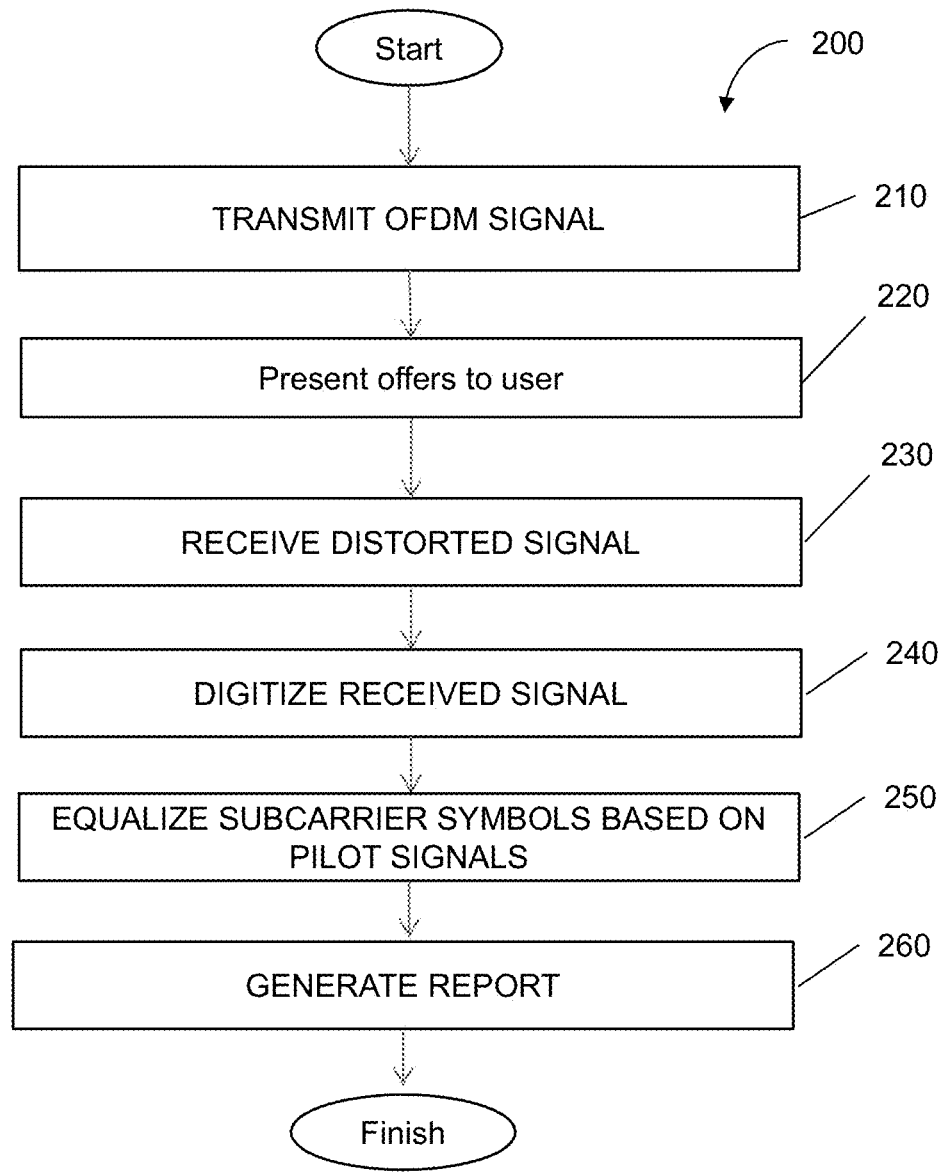
FIG. 2 depicts a method to characterize the response of a broadband wireless channel over a network.

FIG. 2 illustrates a method 200 to characterize the response of a broadband wireless channel over a network. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 210, an OFDM signal may be generated and transmitted across a network. The transmitted OFDM signal may include synchronization and pilot signals without any other data, or the transmitted signal may be a conventional OFDM signal. In embodiments, the transmitted OFDM signal may be transmitted over a channel with a bandwidth. Operation 210 may be performed by a transmitter that is the same as or similar to transmitter 110, in accordance with one or more implementations.

At operation 220, the channel may distort the transmitted signal. In embodiments, the environment between the transmitter and receiver may influence the transmitted signal, such that a transmitter transmitting a signal to a first receiver at a first location may have a different response than the transmitter transmitting the signal to a second receiver at a second location. Operation 220 may be performed by a network that is the same as or similar to network 130, in accordance with one or more implementations.

At operation 230, a receiver may receive the distorted signal over the channel, wherein the signal is distorted by the environment between the receiver and transmitter. In embodiments, the receiver may digitize the received signal. Operation 230 may be performed by receiver that is the same as or similar to receiver 120, in accordance with one or more implementations.

At operation 240, the received digitized signal may be synchronized in the frequency domain the time domain. The signal may be synchronized so symbols associated with the digitized signal may be determined. In embodiments, a FFT may extract the Q and I components of each subcarrier symbol. Operation 240 may be performed by a receiver that is the same as or similar to receiver 120, in accordance with one or more implementations.

At operation 250, the Q and I components of the subcarriers symbols may be equalized based on the pilot symbols transmitted with the OFDM signal. In embodiments, statistics may be determined on a symbol, subcarrier, and frame basis to determine channel response characterizations of the channel carrying the transmitted OFDM signal over the network. Operation 250 may be performed by a receiver that is the same as or similar to receiver 120, in accordance with one or more implementations.

At operation 260, a report for the channel response characterizations of the channel between the transmitter and the receiver carrying the transmitter OFDM signal may be generated. In embodiments, the report may include a power delay profile (PDP), channel impulse response, attenuation and phase response over frequency and time, antenna correlation, and/or other channel information. The parameters of the report may be utilized to determine the channel characteristics and applied to the network as a whole. Operation 260 may be performed by a receiver that is the same as or similar to receiver 120, in accordance with one or more implementations.

Figure 3:
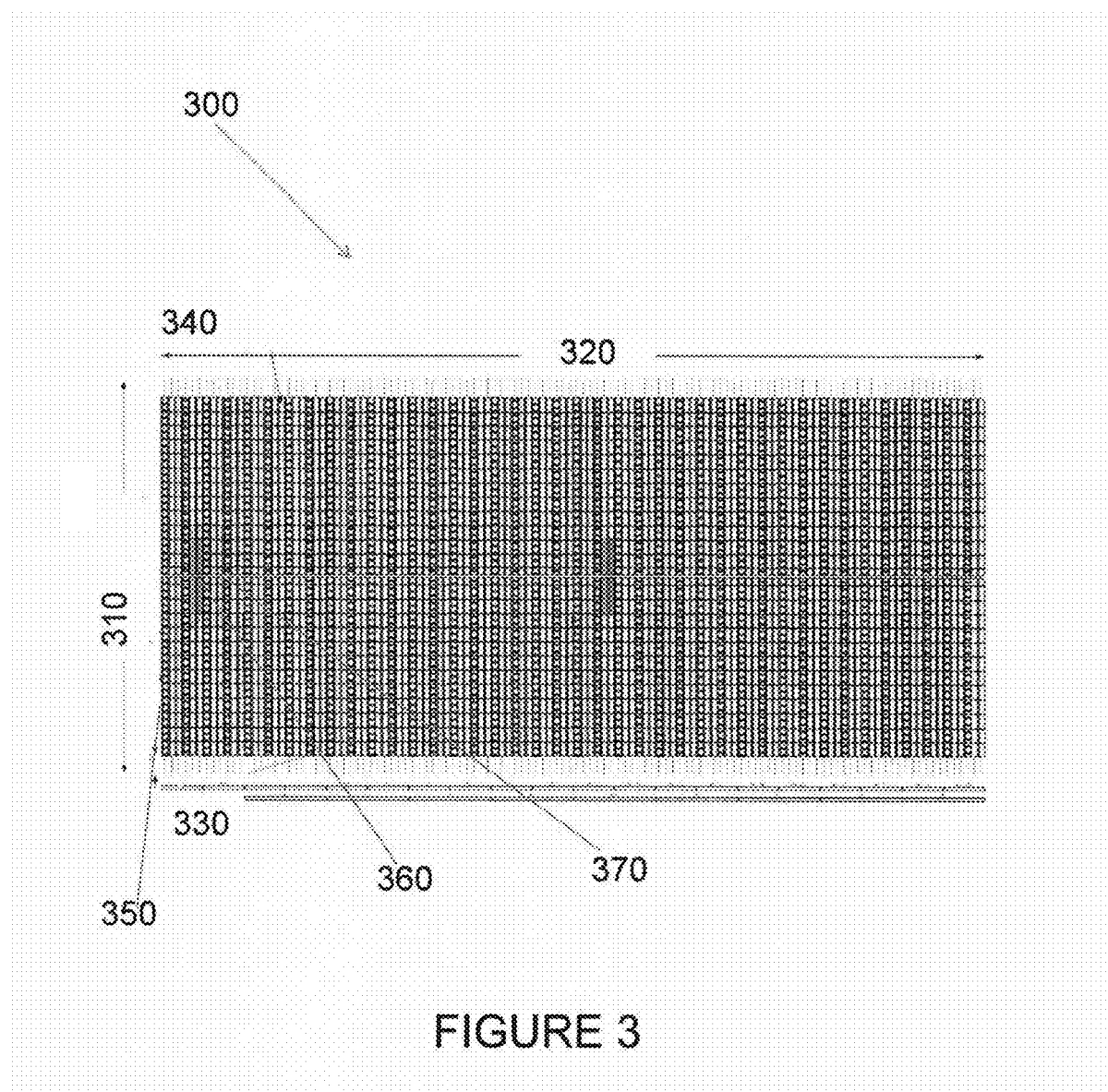
FIG. 3 depicts an OFDM frame that may be transmitted by a transmitter and received by a receiver.

FIG. 3 depicts one example embodiment of an OFDM frame 300 that may be transmitted by a transmitter and received by a receiver. The frame is represented by subcarrier symbols 310 over time 320. The OFDM frame 300 depicted in FIG. 3 may represent the subcarrier symbols 310 over one millisecond, wherein the subcarrier symbols 310 are represented in sub frames 330. In embodiments, different sub frames 330 within the subcarrier symbols 310 may include different data 340.

Utilizing OFDM frame 300 the wireless channel may be characterized. The wireless channel may be characterized responsive to OFDM 300 including reference signals 350 that are transmitted at even intervals within a frame.

OFDM frame 300 may also include synchronization symbols 360, wherein the synchronization symbols are utilized by a receiver to determine the timing of symbols associated with sub frames 330 within OFDM 300. OFDM frame may also include channel symbols 370 that may be utilized to determine the frequency associated with OFDM frame 300. Utilizing the synchronization symbols 360 and channel symbols 370 a receiver may determine the timing and frequency associated with the subcarrier symbols.

Utilizing the synchronization symbols 360 and channel symbols 370, the location of the reference signals 350 within OFDM frame 300 may be determined. Responsive to the location of the reference signals 350 within OFDM frame 300, each reference signal 350 within the OFDM frame 300 may be equalized. The equalized reference signals may be correlated to the transmitted reference signals to determine the distortion of the OFDM frame 300 due to the environment, wherein based on the correlation of the equalized received reference signals 350 to the transmitted reference signals, data 340 within the OFDM frame 300 may be determined.

Figure 4:
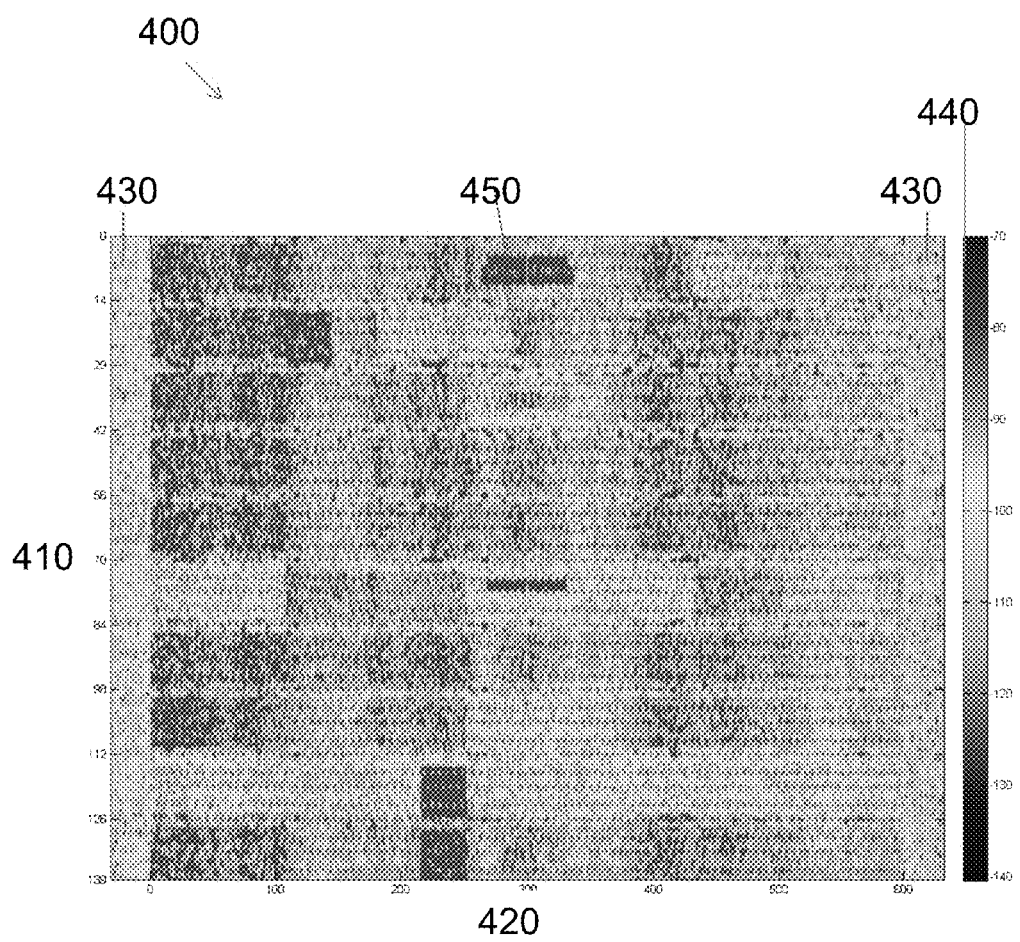
FIG. 4 depicts received OFDM symbols in in frequency and time.

FIG. 4 depicts one example embodiment of a received OFDM frame 400 in in frequency and time. As depicted in FIG. 4, OFDM frame 400 may include symbols 410 and a subcarrier index 420, wherein different symbols 410 over the subcarrier index 420 may have different signal strengths (dBM) 440. In FIG. 4, symbols that have a stronger strength 450 may be associated with the reference signals within OFDM frame 300, and symbols 430 with a weaker strength may be not be associated with a transmitted frame but be associated with noise within the environment.

Figure 5:
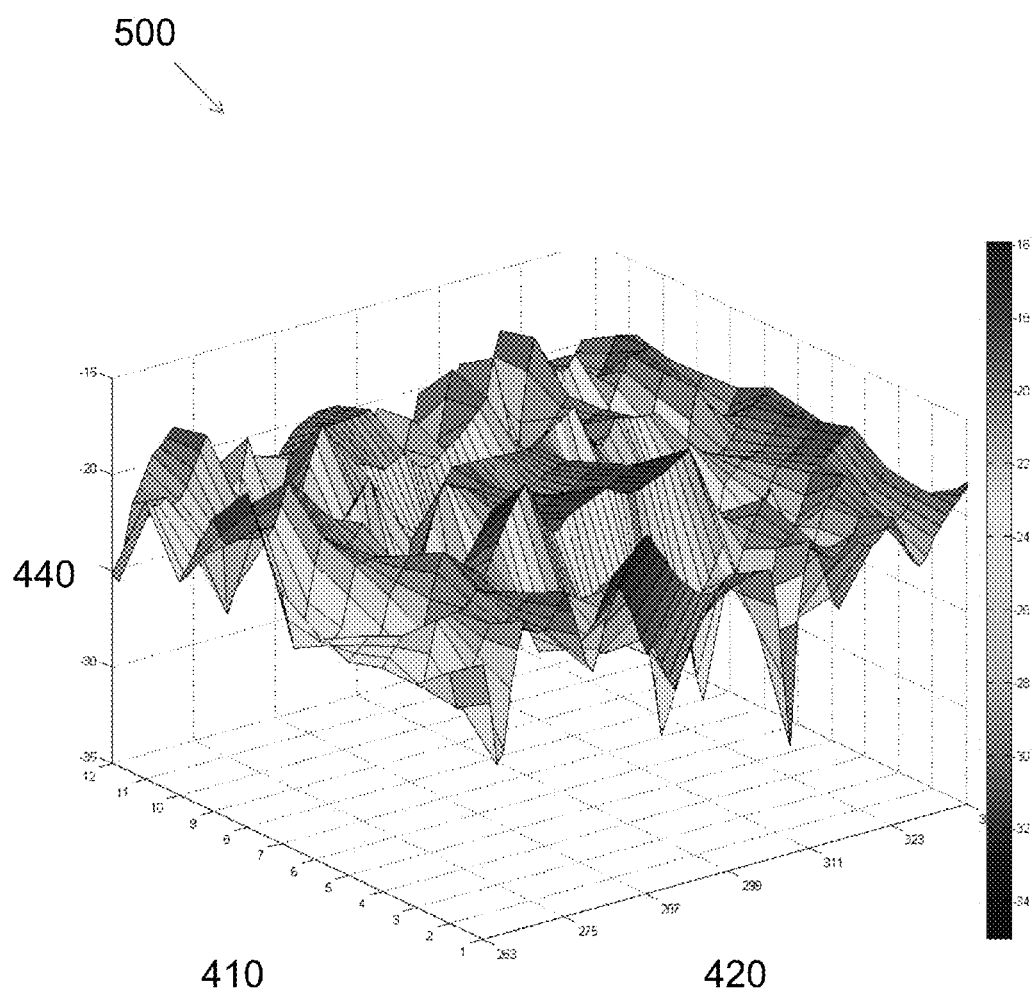
FIG. 5 depicts variation of OFDM frame signals across a channel.

FIG. 5 depicts one example embodiment of the variation of OFDM frame 500 signals across a channel in three dimensional space.

Figure 6:
FIG. 6 depicts an embodiment of a correlation formula that may be utilized to correlate antennas across a channel.

FIG. 6 depicts one example embodiment of a correlation formula 600 that may be utilized to correlate antennas across a channel. However, one skilled in the art will appreciate that different methods and systems may be utilized to correlate multiple-input and multiple-output (MIMO) antennas. In embodiments where a system includes two transmitting antennas, it is important to determine the correlation to the received signals from the two antennas. Therefore, it is important to correlate the two transmitted signals as received by multiple antennas at the same location at the same time. In systems where there is a low correlation or no correlation between the received signals, then the two transmitted signals may be utilized to transmit independent data sets and double the bandwidth of the transmitted signals.

Here, r is the correlation factor between the received signal from antenna x and y, n is the number of sub-carriers considered, i is an instance of n, xi is the received signal for subcarrier I of antenna x, x- is the average signal received from antenna x, yi is the received signal for subcarrier I of antenna y, and y- is the average signal received from antenna y.

Figure 7:
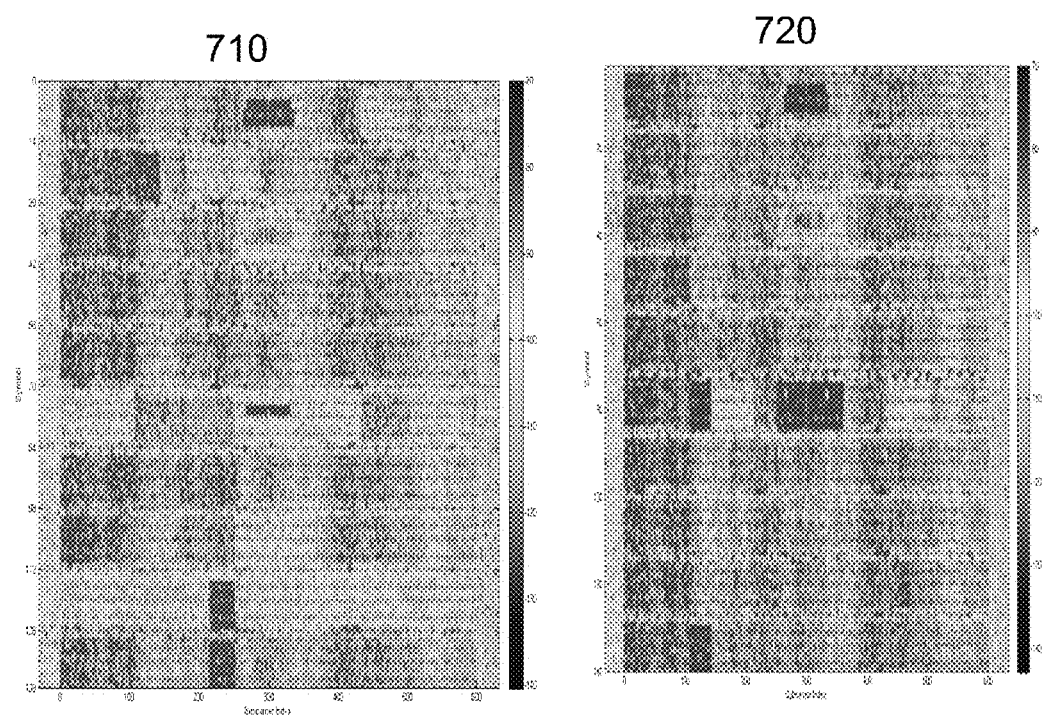
FIG. 7 depicts two received signals transmitted from two different antennas. Responsive to receiving OFDM signal being received from two transmitters, a receiver may calculate correlations between the received signals.

FIG. 7 depicts example embodiments of two received signals 710, 720 transmitted from two different antennas. Responsive to OFDM signal being received from two transmitters, a receiver may calculate correlations between the received signals. The received signals 710 and 720 may be utilized to determine the correlation between the received signals.

In embodiments, the received signals 710, 720 may be associated with the two transmitted signals as received by two different antennas at the same time, wherein the two transmitted signals include two different reference signals. The two different reference signals may be used to adjust, modify, change, etc. the signals transmitted from the two antennas based on the correlation between the two received signals 710, 720. In embodiments, if the two received signals 710, 720 are not correlated with each other, a MIMO system may be utilized to transmit two independent signals, whereas if the received signals 710, 720 are correlated with one another, then the two transmitted signals may be similar signals due to interference.

In embodiments, if the correlation factor as determined by equation 600 is above a correlation threshold, then it may be determined that the signals are correlated with one another. Accordingly, it may be desired to transmit two signals that are similar. Whereas, if the correlation between the two received signals is below the correlation threshold, then it may be determined that the signals are not correlated with one another. Therefore, it may be desired to transmit two independent signals to increase bandwidth.

Figure 8:
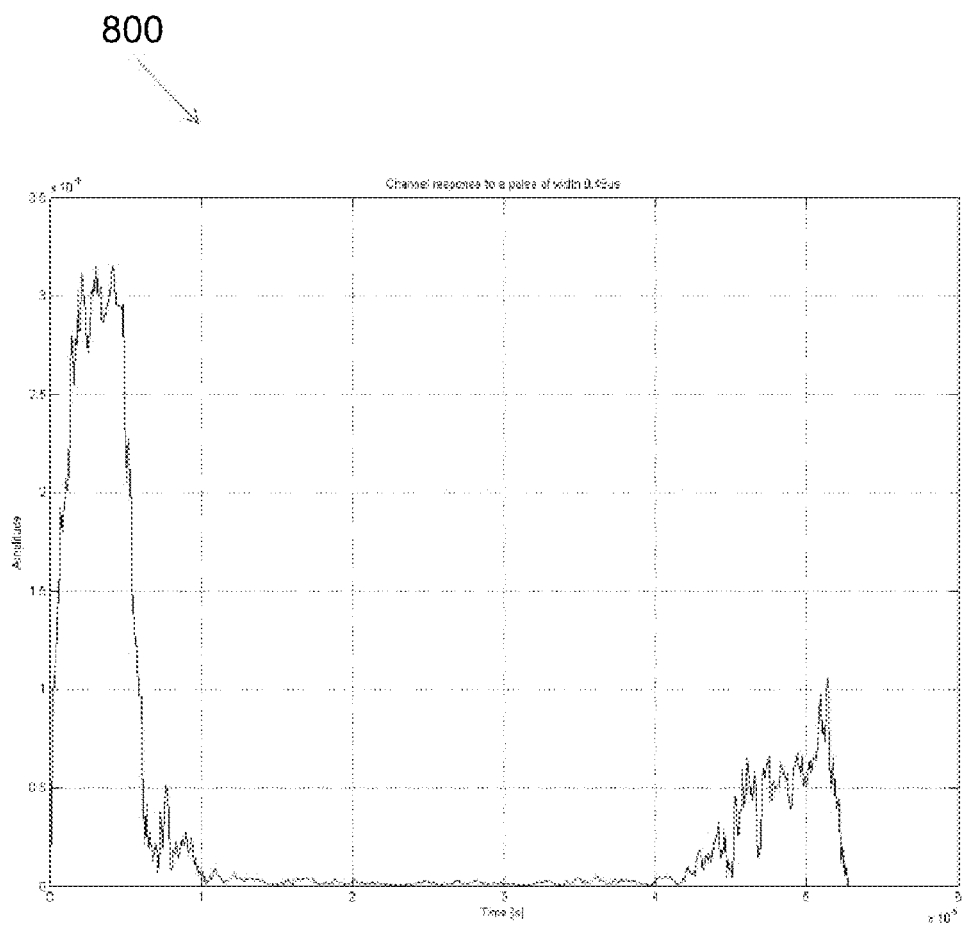
FIG. 8 depicts a power delay profile of a received signal from an antenna. In embodiments, the received signal may allow a receiver to determine the extent of a multipath received and the cyclic prefix requirement of the channel.

FIG. 8 depicts one example embodiment of a power delay profile 800 of a received signal from an antenna. In embodiments, the received signal may allow a receiver to determine the extent of a multipath received and the cyclic prefix requirement of the channel. The power delay profile 800 may include the power profile of multiple frames of a transmitted signal.

Figure 9:
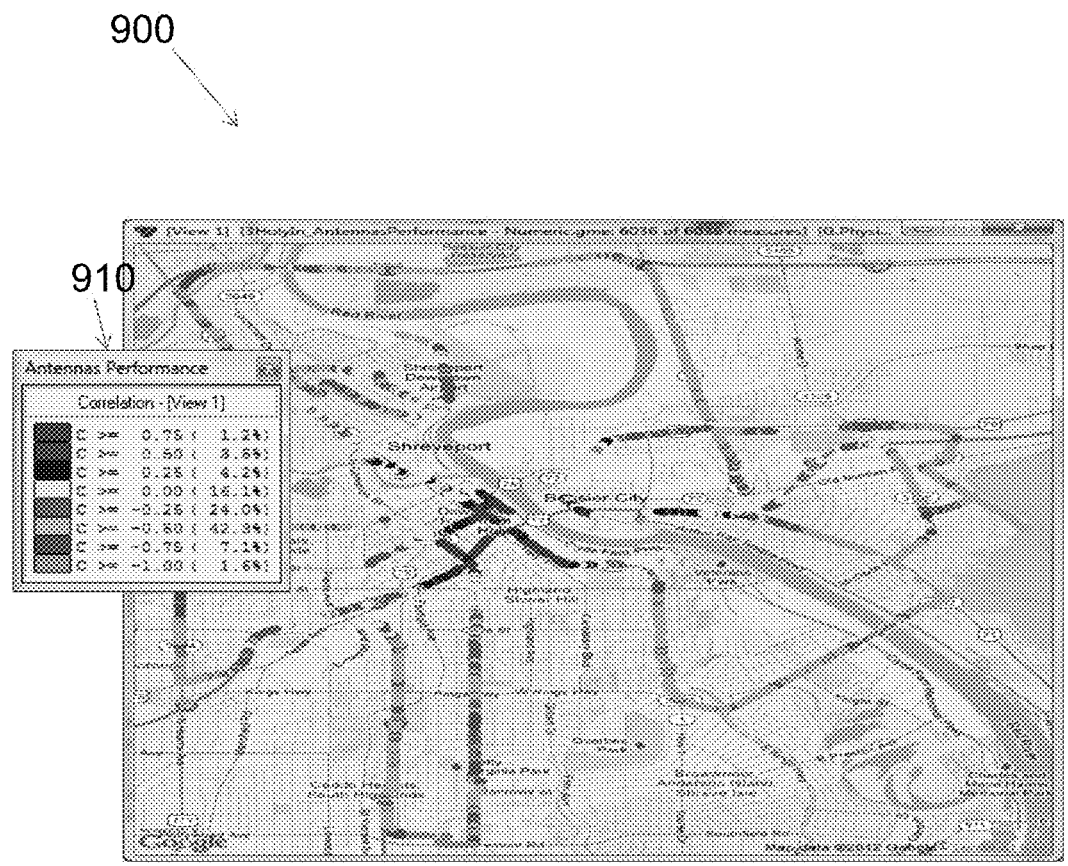
FIG. 9 depicts a drive test where data from a plurality of transmitters and/or receivers may be correlated to determine channel characteristics over a service area.

FIG. 9 depicts one example embodiment of a mapping 900 of a drive test where data from a plurality of transmitters and/or receivers may be correlated to determine channel characteristics over a service area. The mapping 900 may include correlation factors 910 between two antennas receiving the same transmitted signal with different reference symbols, wherein the two antennas receive the transmitted signals at the same location at the same time. Mapping 900 may be completed on a mobile device, wherein the mobile device is configured to remotely store the entire, raw three dimensional wave from of the transmitted signal at the location that the antennas received the transmitted signals. Accordingly, a three dimensional frame of the received wave form may be reconstructed from the received signals. Therefore, the signal may be further parsed to determine additional data of the channel, whereas conventionally only data strength of the received signal is remotely stored.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What I claim is:

1. A system for characterizing a channel of a wireless network,
   the system comprising:
   a transmitter configured to wirelessly transmit an OFDM signal including pilot signals over a network and in an environment that distorts the transmitted OFDM signal, wherein the pilot signals are utilized to establish a RF channel response at a subcarrier level, the pilot signals including reference symbols that are transmitted at set intervals; and
   a receiver configured to receive the OFDM signal, synchronize the OFDM signal in frequency and time to determine the reference symbols within the OFDM signal, perform a fast Fourier transform on the OFDM signal to determine in-phase and quadrature components of each subcarrier symbol within the OFDM signal, and equalize the in-phase and quadrature of each subcarrier signal based on the pilot signals,
   wherein the transmitter includes two transmit antennas, the transmit antennas being configured to transmit the same OFDM signal with different reference symbols within the pilot signals.

2. The system of claim 1, wherein the receiver includes two receive antennas, the receive antennas being configured to receive the two transmitted OFDM signals from the two transmit antennas.

3. The system of claim 2, further including:
   an analyzer configured to determine a correlation factor between the two received OFDM signals based on the equalized in-phase and quadrature components within the received OFDM signals.

4. The system of claim 3, wherein the analyzer is configured to determine whether the correlation factor between the two received OFDM signals is below a correlation threshold.

5. The system of claim 4, wherein the two transmit antennas are configured to transmit different OFDM signals with different data when the correlation factor is below the correlation threshold.

6. The system of claim 2, further including:
   a mobile computing device configured to store a three dimensional representation of the received OFDM signals at a location where the received OFDM signals are received.

7. The system of claim 1, wherein the equalized components of each subcarrier signal are configured to characterize the channel at the subcarrier level.

8. The system of claim 1, wherein the receiver is configured to determine the synchronization pattern and pilot signals to characterize the channel at the subcarrier level.

9. The system of claim 1, wherein the characterizations of the channel include at least one of a channel impulse response, a power delay profile, an amplitude and phase response on the subcarrier level, channel characterization at a frame level, channel characterization at the multi-frame level, and antenna correlation over the network.

10. A method for characterizing a channel of a wireless network, the method comprising:
    wirelessly transmitting an OFDM signal including pilot signals over a network and in an environment that distorts the transmitted OFDM signal, wherein the pilot signals are utilized to establish a RF channel response at a subcarrier level, the pilot signals including reference symbols that are transmitted at set intervals;
    receiving the OFDM signal;
    synchronizing the OFDM signal in frequency and time to determine the reference symbols of the OFDM signal;
    performing a fast Fourier transform on the OFDM signal to determine in- phase and quadrature components of each subcarrier symbol within the OFDM signal; and
    equalizing the in-phase and quadrature of each subcarrier signal based on the pilot signals,
    wherein transmitting the OFDM signal includes transmitting two OFDM signals from two transmit antennas, the transmit antennas transmitting the same signal with different reference symbols within the pilot signals.

11. The method of claim 10, wherein the receiving the OFDM includes receiving the two OFDM signals via two receive antennas, the receive antennas receiving the two transmitted OFDM signals from the two transmit antennas.

12. The method of claim 11, further including:
    determining a correlation factor between the two received OFDM signals based on the equalized in-phase and quadrature components within the two received OFDM signals.

13. The method of claim 12, further comprising:
    determining that the correlation factor between the two received OFDM signals is below a correlation threshold.

14. The method of claim 13, wherein the two transmitted OFDM signals include different data when the correlation factor is below the correlation threshold.

15. The method of claim 11, further including:
    storing a three dimensional representation of the received OFDM signals at a location where the received OFDM signals are received.

16. The method of claim 10, wherein the equalized components of each subcarrier signal are configured to characterize the channel at the subcarrier level.

17. The method of claim 10, further comprising:
    determining the reference symbols that are transmitted at set intervals and pilot signals to characterize the channel at the subcarrier level.

18. A method for characterizing a channel of a wireless network, the method comprising:
    wirelessly transmitting an OFDM signal including pilot signals over a network and in an environment that distorts the transmitted OFDM signal, wherein the pilot signals are utilized to establish a RF channel response at a subcarrier level, the pilot signals including reference symbols that are transmitted at set intervals;
    receiving the OFDM signal;
    synchronizing the OFDM signal in frequency and time to determine the reference symbols of the OFDM signal;
    performing a fast Fourier transform on the OFDM signal to determine in- phase and quadrature components of each subcarrier symbol within the OFDM signal; and
    equalizing the in-phase and quadrature of each subcarrier signal based on the pilot signals, wherein the characterizations of the channel include at least one of a channel impulse response, a power delay profile, an amplitude and phase response on the subcarrier level, channel characterization at a frame level, channel characterization at the multiframe level, and antenna correlation over the network.

* * * * *